US011157731B2

(12) United States Patent
Nepomniachtchi et al.

(10) Patent No.: US 11,157,731 B2
(45) Date of Patent: Oct. 26, 2021

(54) SYSTEMS AND METHODS FOR ASSESSING STANDARDS FOR MOBILE IMAGE QUALITY

(71) Applicant: MITEK SYSTEMS, INC., San Diego, CA (US)

(72) Inventors: Grigori Nepomniachtchi, San Diego, CA (US); Michael Strange, Brea, CA (US)

(73) Assignee: MITEK SYSTEMS, INC., San Diego, CA (US)

( * ) Notice: Subject to any disclaimer, the term of this patent is extended or adjusted under 35 U.S.C. 154(b) by 0 days.

(21) Appl. No.: 16/518,815

(22) Filed: Jul. 22, 2019

(65) Prior Publication Data

US 2019/0347481 A1    Nov. 14, 2019

Related U.S. Application Data

(63) Continuation of application No. 15/721,160, filed on Sep. 29, 2017, now Pat. No. 10,360,447, which is a
(Continued)

(51) Int. Cl.
*G06K 9/00* (2006.01)
*G06K 9/03* (2006.01)

(52) U.S. Cl.
CPC ..... *G06K 9/00463* (2013.01); *G06K 9/00442* (2013.01); *G06K 9/036* (2013.01);
(Continued)

(58) Field of Classification Search
CPC .............. G06K 9/00463; G06K 9/036; G06K 9/00442; G06K 9/00449; G06K 9/00456;
(Continued)

(56) References Cited

U.S. PATENT DOCUMENTS 4,311,914 A * 1/1982 Huber ................ B41F 33/0036
382/112
5,966,473 A 10/1999 Takahashi et al.
(Continued)

FOREIGN PATENT DOCUMENTS

KR    1020070115834 A    12/2007

OTHER PUBLICATIONS

International Search Report issued in related International Application No. PCT/US2011/056593 dated May 30, 2012 (3 pages).
(Continued)

*Primary Examiner* — Vincent Rudolph
*Assistant Examiner* — Timothy Choi
(74) *Attorney, Agent, or Firm* — Procopio, Cory, Hargreaves & Savitch LLP

(57) ABSTRACT

Methods and systems are provided for defining and determining a formal and verifiable mobile document image quality and usability (MDIQU) standard, or Standard for short. The Standard ensures that a mobile image can be used in an appropriate mobile document processing application, for example an application for mobile check deposit. In order to quantify the usability, the Standard establishes 5 quality and usability grades. A mobile image capture device can capture images. A mobile device can receive information associated with one or more image quality assurance (IQA) criteria; evaluating the images to select an image satisfying an image quality criteria based on the received information; and in response to the image satisfying the image quality score, sending the selected image to determine a set of image quality assurance (IQA) scores.

20 Claims, 7 Drawing Sheets

Related U.S. Application Data continuation of application No. 15/397,639, filed on Jan. 3, 2017, now Pat. No. 9,779,297, which is a continuation of application No. 14/217,170, filed on Mar. 17, 2014, now Pat. No. 9,536,139.

(60) Provisional application No. 61/802,039, filed on Mar. 15, 2013.

(52) U.S. Cl.
CPC ..... *G06K 9/00449* (2013.01); *G06K 9/00456* (2013.01); *G06K 9/00483* (2013.01); *G06T 2207/30168* (2013.01); *G06T 2207/30176* (2013.01)

(58) Field of Classification Search
CPC ........ G06K 9/00483; G06K 2017/0038; G06T 2207/30168; G06T 2207/30176
See application file for complete search history.

(56) References Cited

U.S. PATENT DOCUMENTS

| | | | |
|---|---|---|---|
| 5,999,636 A * | 12/1999 | Juang | B41F 33/02 250/559.05 |
| 6,038,351 A | 3/2000 | Rigakos | |
| 6,125,362 A | 9/2000 | Elworthy | |
| 7,072,862 B1 | 7/2006 | Wilson | |
| 7,426,316 B2 | 9/2008 | Vehvilainen | |
| 7,584,128 B2 | 9/2009 | Mason et al. | |
| 7,735,721 B1 | 6/2010 | Ma et al. | |
| 7,869,098 B2 | 1/2011 | Corso et al. | |
| 7,873,200 B1 | 1/2011 | Oakes, III et al. | |
| 7,876,949 B1 | 1/2011 | Oakes, III et al. | |
| 7,978,900 B2 | 7/2011 | Nepomniachtchi et al. | |
| 8,358,826 B1 | 1/2013 | Medina, III et al. | |
| 8,538,124 B1 | 9/2013 | Harpel et al. | |
| 8,540,158 B2 * | 9/2013 | Lei | G06Q 50/18 235/454 |
| 8,959,033 B1 | 2/2015 | Oakes, III et al. | |
| 9,058,512 B1 | 6/2015 | Medina, III | |
| 9,613,258 B2 | 4/2017 | Chen et al. | |
| 9,842,331 B2 | 12/2017 | Nepomniachtchi et al. | |
| 10,360,447 B2 * | 7/2019 | Nepomniachtchi | |
| 2002/0037097 A1 | 3/2002 | Hoyos et al. | |
| 2002/0085745 A1 | 7/2002 | Jones et al. | |
| 2003/0099379 A1 | 5/2003 | Monk et al. | |
| 2004/0017947 A1 | 1/2004 | Yang | |
| 2004/0037448 A1 | 2/2004 | Brundage | |
| 2004/0081332 A1 | 4/2004 | Tuttle et al. | |
| 2004/0109597 A1 | 6/2004 | Lugg | |
| 2004/0205474 A1 | 10/2004 | Eskin et al. | |
| 2004/0236688 A1 | 11/2004 | Bozeman | |
| 2005/0097046 A1 | 5/2005 | Singfield | |
| 2005/0125295 A1 | 6/2005 | Tidwell et al. | |
| 2005/0163362 A1 | 7/2005 | Jones et al. | |
| 2005/0180661 A1 | 8/2005 | El Bernoussi et al. | |
| 2005/0220324 A1 * | 10/2005 | Klein | G07D 11/30 382/112 |
| 2005/0229010 A1 | 10/2005 | Monk et al. | |
| 2006/0045322 A1 | 3/2006 | Clarke et al. | |
| 2006/0045344 A1 | 3/2006 | Paxton et al. | |
| 2006/0177118 A1 | 8/2006 | Ibikunle et al. | |
| 2007/0009155 A1 | 1/2007 | Potts et al. | |
| 2007/0086643 A1 | 4/2007 | Spier et al. | |
| 2007/0110277 A1 | 5/2007 | Hayduchok et al. | |
| 2007/0114785 A1 | 5/2007 | Porter | |
| 2007/0154071 A1 | 7/2007 | Lin et al. | |
| 2007/0168382 A1 | 7/2007 | Tillberg et al. | |
| 2007/0206877 A1 | 9/2007 | Wu et al. | |
| 2007/0211964 A1 | 9/2007 | Agam et al. | |
| 2007/0288382 A1 | 12/2007 | Narayanan et al. | |
| 2007/0297664 A1 | 12/2007 | Blaikie | |
| 2008/0040280 A1 | 2/2008 | Davis et al. | |
| 2008/0086420 A1 | 4/2008 | Gilder et al. | |
| 2008/0152238 A1 | 6/2008 | Sarkar | |
| 2008/0174815 A1 | 7/2008 | Komaki | |
| 2008/0183576 A1 | 7/2008 | Kim et al. | |
| 2009/0063431 A1 * | 3/2009 | Erol | G06K 9/6293 |
| 2009/0185736 A1 | 7/2009 | Nepomniachtchi | |
| 2009/0185737 A1 | 7/2009 | Nepomniachtchi | |
| 2009/0198493 A1 | 8/2009 | Hakkani-Tur et al. | |
| 2010/0038839 A1 | 2/2010 | DeWitt et al. | |
| 2010/0102119 A1 | 4/2010 | Gustin et al. | |
| 2010/0114765 A1 | 5/2010 | Gustin et al. | |
| 2010/0114766 A1 | 5/2010 | Gustin et al. | |
| 2010/0114771 A1 | 5/2010 | Gustin et al. | |
| 2010/0114772 A1 | 5/2010 | Gustin et al. | |
| 2010/0200660 A1 | 8/2010 | Moed et al. | |
| 2010/0208282 A1 | 8/2010 | Isaev | |
| 2010/0254604 A1 | 10/2010 | Prabhakara et al. | |
| 2011/0013822 A1 | 1/2011 | Meek et al. | |
| 2011/0052065 A1 | 3/2011 | Nepomniachtchi et al. | |
| 2011/0091092 A1 | 4/2011 | Nepomniachtchi et al. | |
| 2011/0280450 A1 * | 11/2011 | Nepomniachtchi | G06K 9/036 382/112 |
| 2011/0289028 A1 | 11/2011 | Sato | |
| 2012/0010885 A1 | 1/2012 | Hakkani-Tur et al. | |
| 2012/0030104 A1 | 2/2012 | Huff et al. | |
| 2012/0033892 A1 | 2/2012 | Blenkhorn et al. | |
| 2012/0070062 A1 | 3/2012 | Houle et al. | |
| 2012/0150773 A1 | 6/2012 | DiCorpo et al. | |
| 2012/0197640 A1 | 8/2012 | Hakkani-Tur et al. | |
| 2012/0201416 A1 | 8/2012 | DeWitt et al. | |
| 2012/0230577 A1 | 9/2012 | Calman et al. | |
| 2012/0278336 A1 | 11/2012 | Malik et al. | |
| 2013/0058531 A1 | 3/2013 | Hedley et al. | |
| 2013/0120595 A1 | 5/2013 | Roach et al. | |
| 2013/0223721 A1 | 8/2013 | Nepomniachtchi et al. | |
| 2013/0325706 A1 | 12/2013 | Wilson et al. | |
| 2014/0037183 A1 * | 2/2014 | Gorski | G06K 9/00449 382/138 |
| 2014/0040141 A1 | 2/2014 | Gauvin et al. | |
| 2014/0064621 A1 | 3/2014 | Reese et al. | |
| 2014/0108456 A1 | 4/2014 | Ramachandrula et al. | |
| 2014/0126790 A1 | 5/2014 | Duchesne et al. | |
| 2014/0133767 A1 | 5/2014 | Lund et al. | |
| 2014/0307959 A1 | 10/2014 | Filimonova et al. | |
| 2016/0092730 A1 | 3/2016 | Smirnov et al. | |

OTHER PUBLICATIONS

Office Action for related CA Patent Application No. 2,773,730, dated Aug. 21, 2017, in 4 pages.

Office Action for related U.S. Appl. No. 16/259,896, dated Dec. 12, 2019, in 22 pages.

Notice of Allowance for related U.S. Appl. No. 16/579,625, dated Jan. 13, 2020 in 27 pages.

* cited by examiner

SYSTEMS AND METHODS FOR ASSESSING STANDARDS FOR MOBILE IMAGE QUALITY

RELATED APPLICATIONS

The present application is a continuation of U.S. patent application Ser. No. 15/721,160, filed on Sep. 29, 2017, which is a continuation of U.S. patent application Ser. No. 15/397,639, filed on Jan. 3, 2017, now issued as U.S. Pat. No. 9,779,297, which is a continuation of U.S. patent application Ser. No. 14/217,170, filed on Mar. 17, 2014, now issued as U.S. Pat. No. 9,536,139, which claims priority to provisional application No. 61/802,039, filed on Mar. 15, 2013, all which are hereby incorporated by reference in their entirety.

BACKGROUND

1. Field of the Invention

The embodiments described herein relate to processing images captured using a mobile device, and more particularly to developing standards for processing the images and assessing an image processing system to determine whether it meets the standards.

2. Related Art

The use of mobile devices to capture images is ubiquitous in modern culture. Aside from taking pictures of people, places and events, users are utilizing the cameras on their devices for many different purposes. One of those purposes is capturing images of content that the user later wants to review, such as a description of a product, a document, license plate, etc.

Financial institutions and other businesses have become increasingly interested in electronic processing of checks and other financial documents in order to expedite processing of these documents. Some techniques allow users to scan a copy of the document using a scanner or copier to create an electronic copy of the document that can be digitally processed to extract content. This provides added convenience over the use of a hardcopy original, which would otherwise need to be physically sent or presented to the recipient for processing. For example, some banks can process digital images of checks and extract check information from the image needed to process the check for payment and deposit without requiring that the physical check be routed throughout the bank for processing.

Mobile devices that incorporate cameras are ubiquitous and may also be useful to capture images of financial documents for mobile processing of financial information. The mobile device may be connected with a financial institution or business through a mobile network connection. However, the process of capturing and uploading images of financial documents using the mobile device is often prone to error, producing images of poor quality which cannot be used to extract data. The user is often unaware of whether the captured document image is sufficient and capable for processing by a business or financial institution.

Attempts have been made to improve the quality of mobile images of financial documents to improve the accuracy of information extracted therefrom. There are numerous ways in which an image can be improved for extracting its content, some of which are implemented individually and some of which are implemented together. However, it is difficult to determine which methods are the best at improving image quality and content extraction. Of the methods often used, it is even more difficult to select a threshold of that particular method which will provide an accurate capture in as little time as possible. Finally, determining whether an image processing system is capable of performing adequate image capture, processing and content extraction has not been explored.

Therefore, there is a need for identifying image processing techniques which will provide optimal image correction and accurate content extraction.

SUMMARY

Embodiments described herein provide methods for defining and determining a formal and verifiable mobile document image quality and usability (MDIQU) standard, or Standard for short. The goal of this Standard is to ensure that a mobile image can be used in an appropriate mobile document processing application, for example an application for mobile check deposit, mobile bill pay, mobile balance transfer or mobile insurance submission and application. In order to quantify the usability, the Standard establishes 5 quality and usability grades: the higher grade images will tend to produce higher accuracy results in the related "mobile" application. A mobile image is first tested to determine if the quality is sufficient to obtain content from the image by performing multiple different image quality assessment tests. If the image quality is sufficient, one or more document usability computations are made to determine if the document or content in the image is usable by a particular application. A ranking is then assigned to the image based on the results of the tests which is indicative of the quality and usability of the image.

Systems and methods are provided for developing standards of image processing for mobile image capture and assessing whether mobile processing engines meet the standards. A mobile processing engine (MDE) is evaluated to determine if it can perform one or more technical capabilities for improving the quality of and extracting content from an image of a financial document (such as a check). A verification process then begins, where the MDE performs the image quality enhancements and text extraction steps on sets of images from a test deck of good and bad images of financial documents with known content. The results of the processing of the test deck are then evaluated by comparing confidence levels with thresholds to determine if each set of images should be accepted or rejected. Further analysis determines whether any of the sets of images were falsely accepted or rejected, and an overall error rate is computed. The overall error rate is then compared with minimum accuracy criteria, and if the criteria are met, the MDE meets the standard for mobile deposit The goal of this Standard is to ensure that a mobile image can be used in an appropriate mobile document processing application, primarily Mobile Deposit [1], Mobile Bill Pay [2], Mobile Balance Transfer [3] and Mobile Insurance [4].

Other features and advantages should become apparent from the following description of the preferred embodiments, taken in conjunction with the accompanying drawings.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding and shall not be considered limiting of the breadth, scope, or applicability of the embodiments. It should be noted that for clarity and ease of illustration these drawings are not necessarily made to scale.

DETAILED DESCRIPTION

I. Summary of Mobile Deposit Standards

Embodiments described herein define formal and verifiable mobile document image quality and usability (MDIQU) standard, of Standard for short. The goal of this Standard is to ensure that a mobile image can be used in an appropriate mobile document processing application, primarily mobile check deposit, mobile bill pay, mobile balance transfer or mobile insurance submission and application, although this list is only illustrative of the types of images and documents which may take advantage of the methods.

In order to quantify the usability, the Standard establishes 5 quality and usability grades: the higher grade images will tend to produce higher accuracy results in the related "mobile" application. The standards for various mobile document processing applications may use the ranking system established by this invention in order to define the various accuracy levels. For example, a mobile deposit standard may require MICR accuracy of 99% on mobile images of checks which are Grade 1 (the highest) according to this Standard, 97% on Grade 2 mobile images etc. The lowest grade (or 2 lowest grades, depending on application preferences) defines unusable images for which no meaningful prediction of accuracy could be made.

Given an application (e.g. Mobile Deposit) and a mobile image, MDIQU answers two basic questions:
1. Does the mobile image have good image quality?
2. Does the image contain a document which is valid for the particular application it's intended for (a valid US check in case of MD)?

Moreover, if the image quality is characterized as bad, MDIQU will detect a particular quality defect.

The answer on the first question (Image Quality) doesn't depend on the type of document or application in question. All that MDIQU is supposed to verify is that a human would easily read the relevant data off the mobile image. For example, a good quality mobile image of a check must contain the entire check (all 4 corners), be high contrast/sharp with all the characters being legible. The same will apply to mobile images of a bills, driver's licenses etc.

The answer on the second question (Document Validity) is supposed to ensure that the document within the image is indeed a check, a bill, a driver's license etc. Therefore, the validity factor is defined for each application independently.

II. MDIQU System and Workflow

Figure 1:
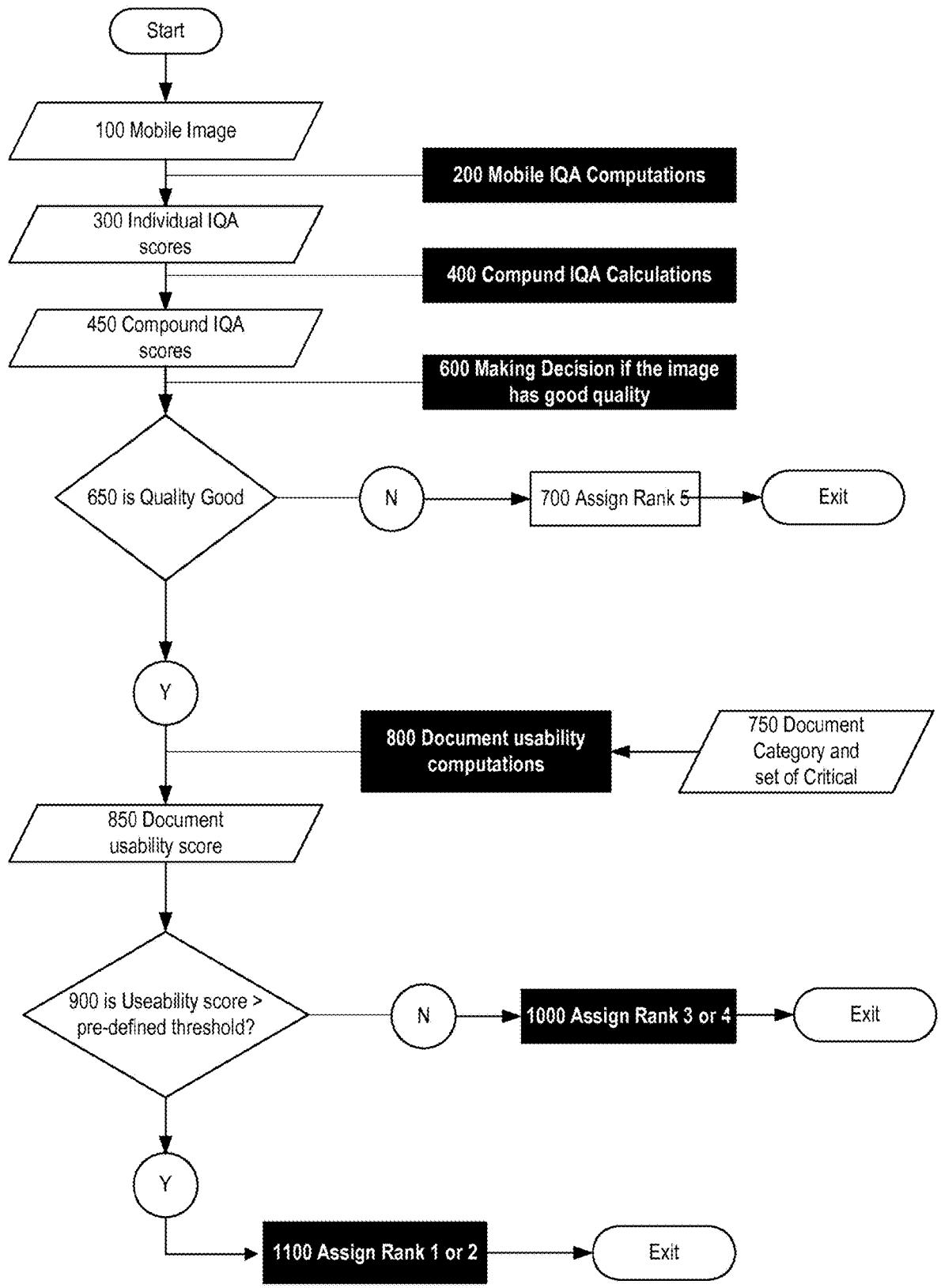
FIG. 1 illustrates a method of assessing, grading and ranking an image to determine an image quality and an image usability, according to one embodiment of the invention.

FIG. 1 illustrates a flowchart of a workflow for assessing mobile image quality standards, according to one embodiment of the invention. The steps may include:

100—accept mobile image under examination and an expected document type
200—compute individual IQA scores
300—output individual IQA scores
400—compute compound IQA scores (see Section 4)
450—output compound IQA scores
600—make decision if image quality is sufficient to proceed
700—if "No", assign image the lowest rank and exit workflow (in this case, the document can't be even extracted from the image).
750—if "Yes," receive document category and optionally set of critical fields
800—compute usability score from document category and critical fields
850—output document usability score
900—compares usability score to pre-defined threshold
1000—if score is low, assign Rank 3 of Rank 4, then exit.
1100—if score is high, assign Rank 1 of Rank 2, then exit.

Figure 2:
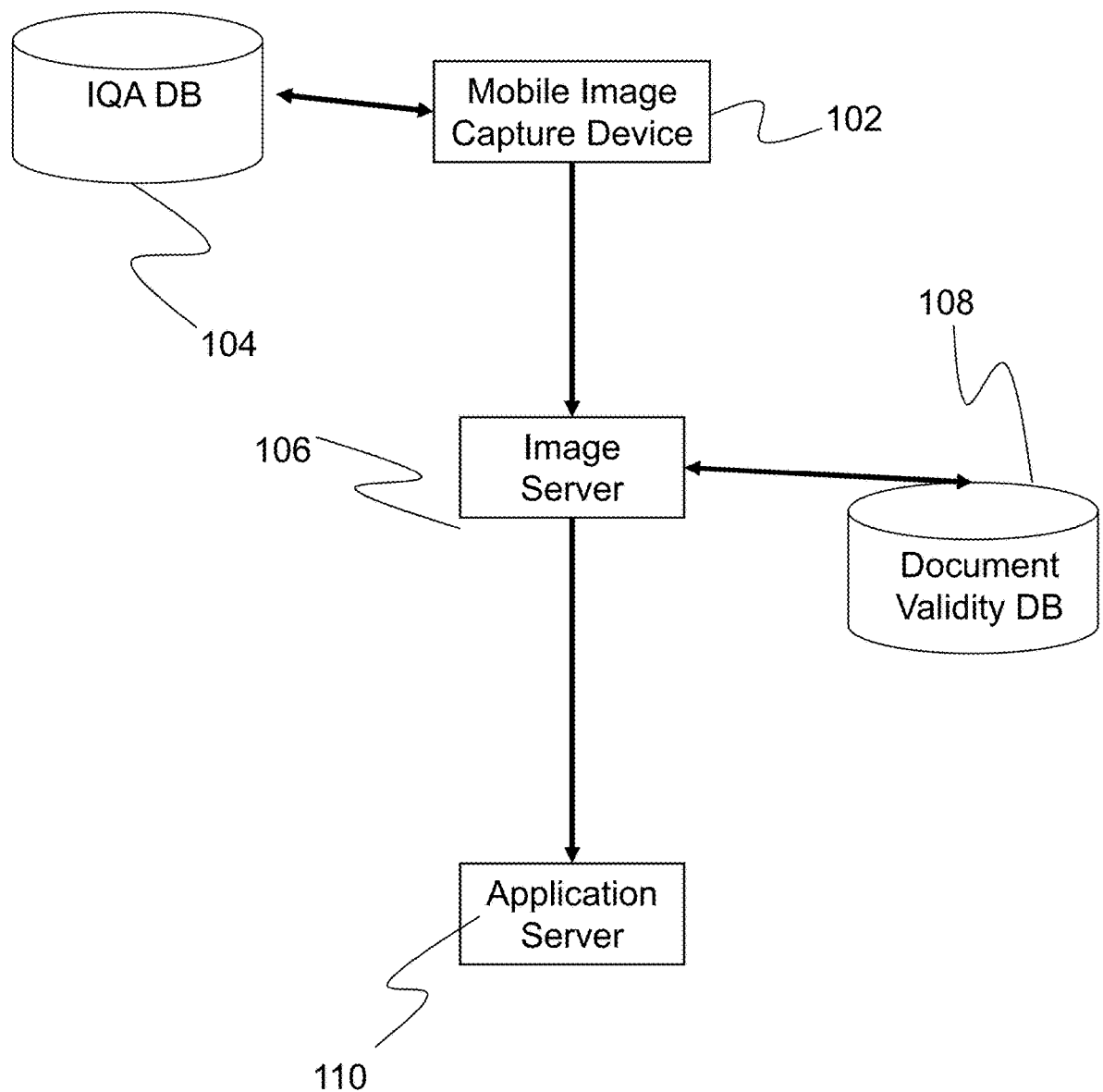
FIG. 2 illustrates a system for assessing, grading and ranking the image utilizing a mobile image capture device and image server, according to one embodiment of the invention.

One embodiment of an MDIQU system is illustrated in FIG. 2, where a mobile image capture device 102 with an image quality assurance database 104 is connected with an image server 106 with a document validity database 108. Thus, the mobile device 102 may perform one or more of the IQA steps based on information stored in the IQA DB 104 to determine an image quality score, after which the image (if sufficient) is sent to the image server for performing a document validity test using information stored in the document validity DB 108. An image with a sufficient quality and usability may then be transmitted to an application server 110 where an application will utilize the image and its content for a particular task. Although not illustrated herein, the system may also perform the IQA tests at the image server 106, and even perform the document usability tests at the mobile device 102.

III. Individual Mobile Image Quality Tests

In one embodiment, the MDIQU system performs the following image quality tests (Mobile IQA tests) to detect the following image deficiencies: Out-of-focus (OOF), Shadow, Small size, View Skew (perspective distortion), Plain Skew, Warped, Low Internal Contrast, Reflection, Cut Corners, Cut Sides, Busy Background and Low External Contrast. Each score should be returned on the scale of 0 to 1000, when 0 means "No defect" and 1000 means "Severe Defect". Alternately, MDIQU system may detect absence of the defects, thus swapping 0 and 1000.

U.S. Pat. No. 8,582,862, issued Nov. 12, 2013, gives a description of the Mobile IQA tests and corresponding algorithms, and is herein incorporated by reference in its entirety. Below is a brief description of IQA tests along with their relative importance.

| IQA Score | Importance | How it gets computed |
|---|---|---|
| OOF | High for all applications | OOF is computed on grey-scale snippets of documents based on frequencies of high-contrast local areas. The more high-contrast areas is found, the higher score becomes (1000 means "absolutely sharp") |
| Shadowed | High for MD, Medium otherwise | "Shadowed" score is computed on grayscale snippets of documents. The engine tries to break the entire snippet into 2 areas of very different brightness. For each such representation (could be several), the engine takes into account the delta in brightness and the size of the "darker" area. If the delta is high enough and the size of "darker" area is close to 50%, a "perfect" shadow is registered, making the score = 0.1000 means "no shadow" |
| Reflection | High for Insurance, low otherwise | Thus IQA score was designed to detect glare on the image and assign a numeric value to its size so that 0 would mean "no glare", and 1000 would mean "significant" glare |
| Low Internal Contrast | Medium | Firstly, the engine computes the brightness histogram using grayscale snippet of the document. The histogram is a 256-values vector H[ ], where H[0] is the number of pixels with brightness 0 (absolutely black) ... up to H[255] is the number of pixels with brightness 0 (absolutely white). Secondly, having computed the histogram H, the engine finds out where 1/3 of all pixels are located counting from 0 upwards (G1) and from 255 downwards (G2). Then weighted averages of brightness are computed for [0, G1] and [G2, 255], which could be considered average "darkness" (D) and average "lightness" (L) of the snippet respectively. The difference L-D describes the contrast. After proper normalization, 0 means very poor contrast and 1000 means very high contrast |
| Darkness | Medium | The goal of this score is to ensure that the image is not too dark.. Firstly, the engine computes the brightness histogram using grayscale snippet of the document as explained above. Then a weighted average grayscale value (G) is computed. After proper normalization G = 255 is translated into 1000 (document is pure white), G = 0 is translated into 0 (absolutely black) |
| Plain Skew | Low | This IQA reflects 2D skew of the document (no skew means the document's sides are parallel to the image sides). After normalization, 1000 means 0 degrees skew while 0 means 45 degrees (45 degrees is the maximum: further 2D rotation will mean that the document changed orientation). The importance of detection view skew is low as Moobile SDK handles hight degree of 2D skew nicely. |
| View Skew | Mid | This IQA reflects 3D (view) angle between the camera and the document No view angle means that the camera view is perpendicular to the the document surface. When the view angle becomes significant, the document becomes perspectively distorted. After normalization, 1000 means 0 degrees skew while 0 means 22 degrees, |
| Cut Corners (side) | High | This IQA reflects presence of all four corners of the document within the mobile image. The engine finds out if a corner is located outside of the image as part of the automatic framing/cropping process. Depending on how big is the missing (cut-off) part of the corner, the engine computes a penalty per corner. Zero penalty means that the corner resides inside the image, maximum penalty is assigned when at least 25% (by area) of the image quadrant related to this corner is cut-off. Then maximum of 4 penalties computed for all for corners becomes the overall cut-corner penalty. After normalization, 1000 means that no penalty was computed for all corners; 0 means that at least 1 (unspecified) corner was penalized by max. penalty (see above) |
| Small Image | Low | This score is computed by comparing the document snippet size against the mobile image size (the latter becomes known after cropping). When the camera moves away from the document, the snippet becomes smaller, thus causing low values of this IQA metric. After normalization, the score of 1000 means that the document occupies at least $1/3^{rd}$ of the entire mobile image area, while 0 means that it occupies less than $1/6^{th}$ of the entire mobile image area. The importance of detection Small Image is low as Moobile SDK handles even small images quite nicely. |

| IQA Score | Importance | How it gets computed |
|---|---|---|
| Warpage | None for DLs, Medium otherwise | The score is computed as a measure of how flat the document is. The way to compute that is to measure how far the snippet sides deviate from ideal straight lines. To normalize such deviation, its maximum value along side is divided by the perpendicular side's length. For example, to compute "flatness" along the upper horizontal side of the document, the largest deviation (in pixels) is divided by the document snippet height. In the end, the largest normalized deviation is taken, and then further normalized to become IQA: if the document is absolutely flat, the score becomes 1000; the deviation of 25% and more becomes 0. |
| Low External Contrast | High for DLs, otherwise medium | There is insufficient contrast between the document and the background (making it harder to located the document) |
| Busy Background | High for DLs, otherwise medium | Too many contrasting objects detected in the background (making it harder to located the document) |

Examples of Individual Mobile Defects

Figure 3:
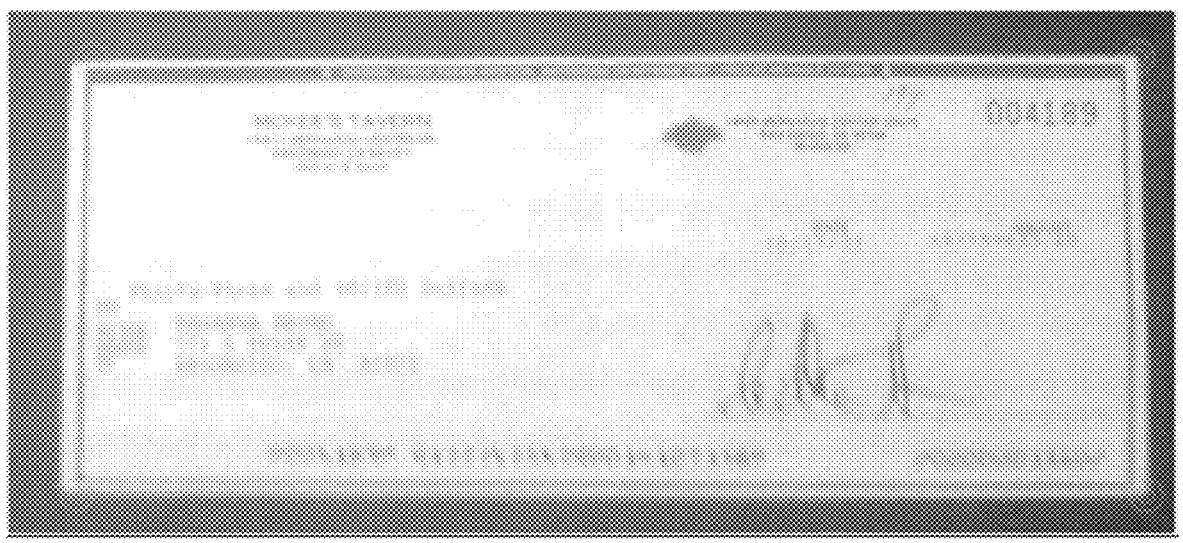
FIG. 3 is an image illustrating an example of an out-of-focus (OOF) image identified during an OOF image quality test, according to one embodiment of the invention.

FIG. 3 illustrates an image which is out of focus (OOF) and would be identified with an OOF IQA test. The algorithm may be modified to be computed only "on characters". This means that a special filter is used to detect positions of text characters, which then are used in the computation while the other areas are ignored. FIG. 3 illustrates an example of poor OOF (OOF score=90).

Reflection IQA testing doesn't work well on the image level and needs to be "localized" to the field level.

Figure 4A:
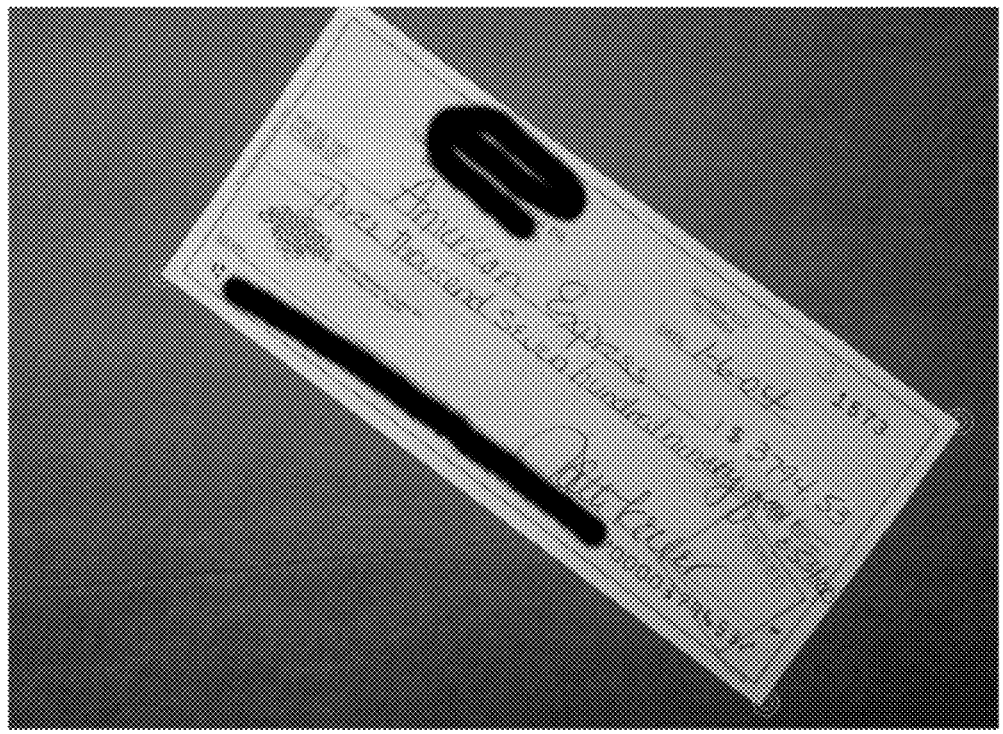
FIGS. 4A and 4B are images of plain skew and view skew images, respectively, identified during a skew image quality test, according to one embodiment of the invention.
Figure 4B:
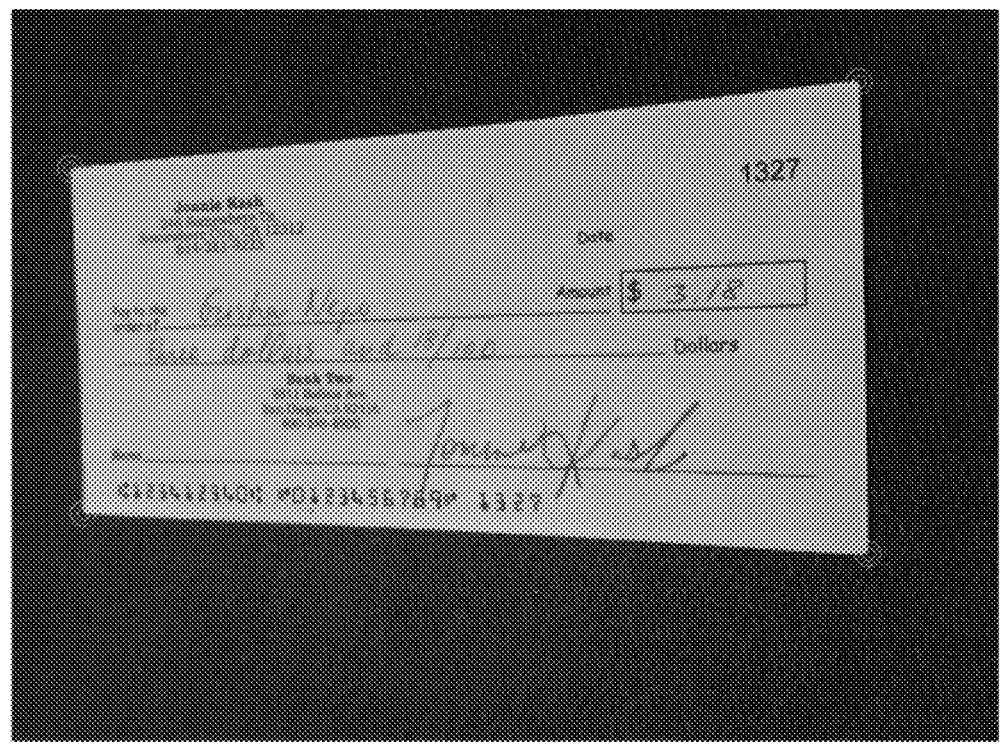

FIG. 4A illustrates an image of a document with poor plain skew (IQA=200), while FIG. 4B illustrates an image of a document with a view skew.

Figure 5A:
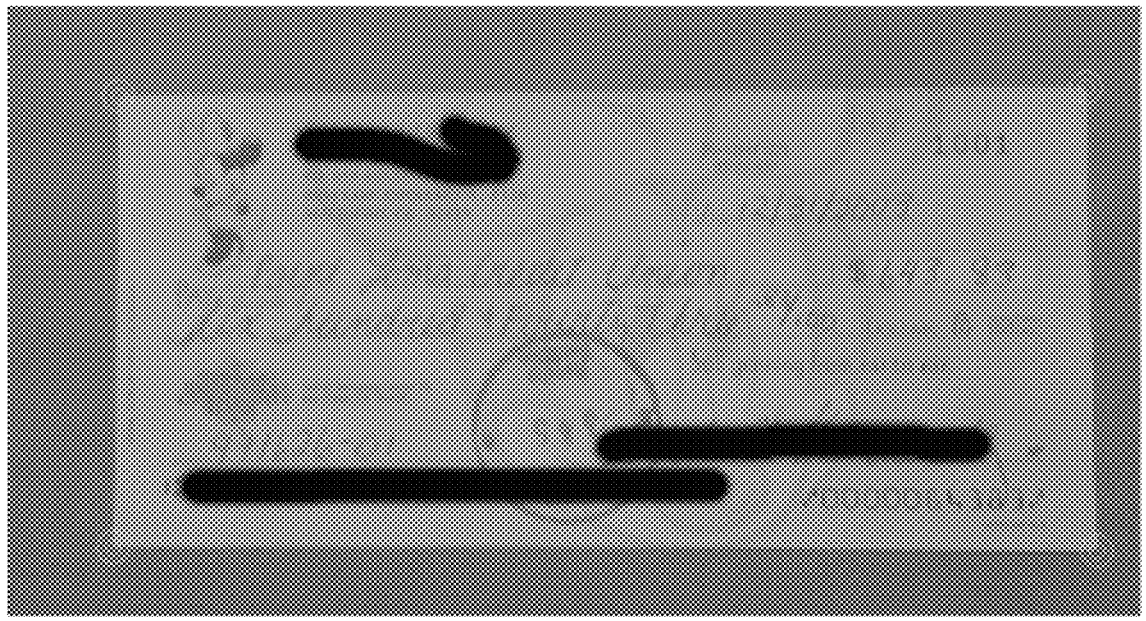
FIGS. 5A and 5B are images of a low contrast image and poor darkness image, respectively, identified during a low internal contrast image quality test, according to one embodiment of the invention.
Figure 5B:
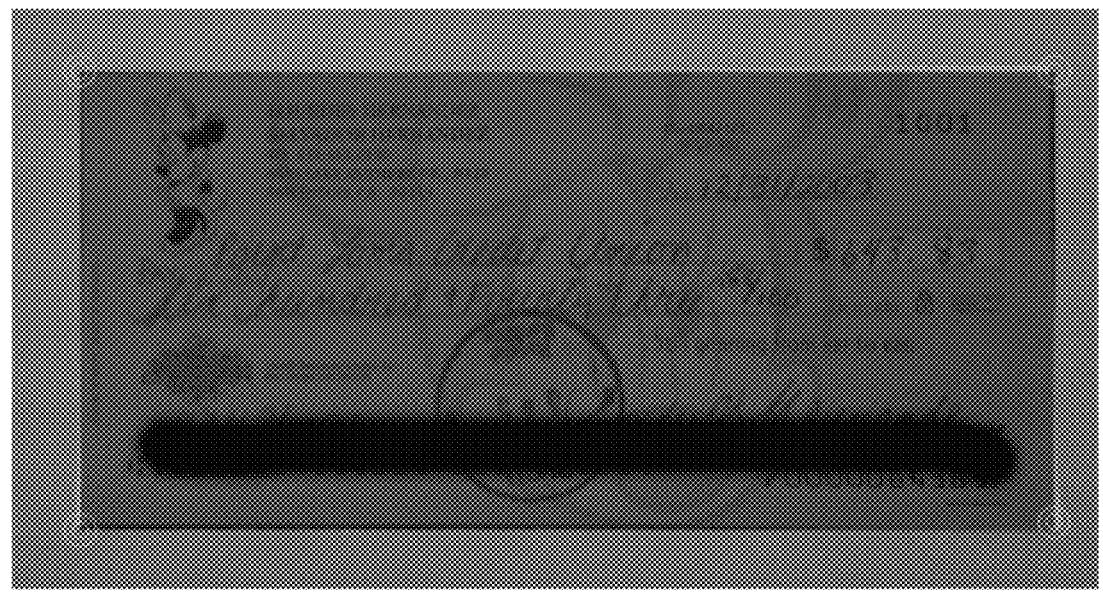

FIG. 5A illustrates an image with low contrast (specifically a low contrast IQA=210). This IQA should not be confused with Low Contrast background: the former describes contrasts inside the document whereas the latter outside (between the document and background). FIG. 5B illustrates an image which suffers from darkness, and therefore has a darkness IQA score of 290.

Figure 6A:
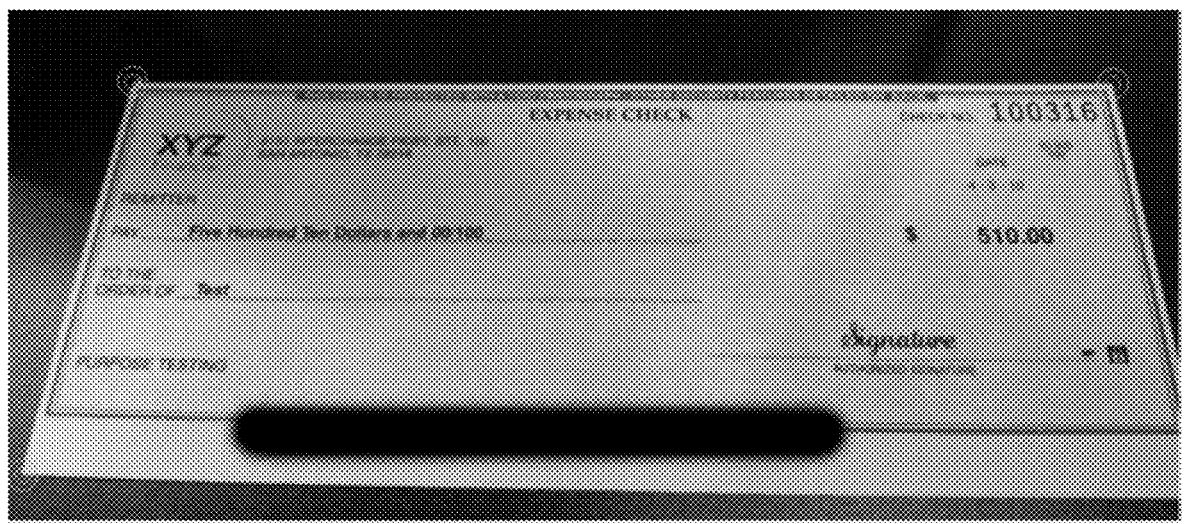
FIG. 6A is an image of a document where the corners are cut off, as would be identified during a cut corner image quality test, according to one embodiment of the invention.
Figure 6B:
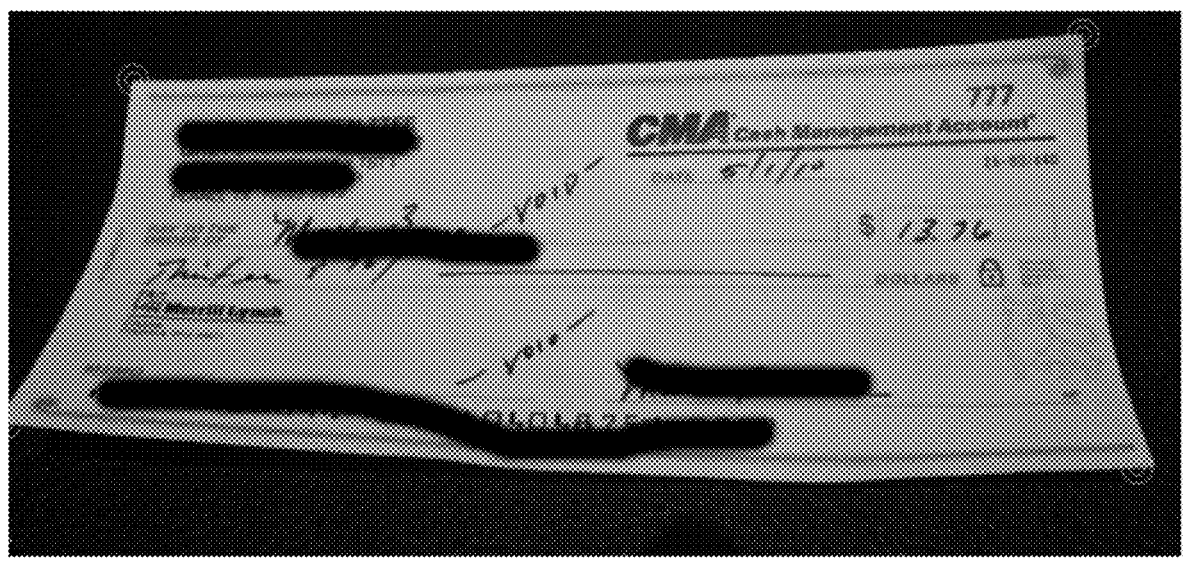
FIG. 6B is an image of a warped document which would be identified during a warpage image quality test, according to one embodiment of the invention.

FIG. 6A illustrates an image of a document with cut corners, receiving a score of 900. FIG. 6B illustrates an image of a document with a warped image, receiving a warpage score of 0.

These IQA scores may be averaged or combined to determine a total score or weighted depending on the relevance of a particular IQA test. Nevertheless, a simple threshold value may be set to determine whether the image has sufficient quality to proceed to the document usability tests.

IV. Compound IQA Scores

Embodiments of the invention use individual mobile IQA scores to automatically create two compound IQA scores which will ensure that the mobile document could be detected in the mobile image as well as that the document is fully legible. The first compound IQAs will be titled "Crop IQA" and "Quality IQA."

Benefits of Compound IQAs Over "Individual" IQAs

Simplicity: There are more than a dozen of individual IQAs and in essence they are being replaced by 2 compounded ones: "crop" and "quality". It's much better to move two dials than a dozen.

Eliminating wrong messages: In reality, some individual IQAs are strongly correlated between themselves and with other defects. For example, shadow and darkness (2 different IQAs) may cause low OOF (another IQA) as also can small image (yet another IQA); wrong crop (has its own IQA) can cause wrong identification and therefore present the image as "unsupported" and so on. By compounding related IQAs we avoid potential misclassifications and get rid of this hierarchy and thresholds altogether. MIP will have a much smaller set of thresholds (3) and the error classifier will be well-tested and optimized in R&D.

Description of Compound IQA Scores

The compound IQA scores are linear combinations of individual IQA score. The coefficients in combination depend on application as different individual IQA score have different importance for different document categories, see table 2.

V. Document Usability

Embodiments of the MDIQU system provide document usability testing to ensure that the document within the image is indeed a check, a bill, a driver's license etc.

The following categories may be supported: US Checks (Mobile Deposit), Remittance Coupon (Mobile Bill Pay), Credit Card Bills (Mobile Balance Transfer), and Driver's License (Mobile Insurance).

Definition of Critical Fields

The usability testing is based on a definition of Critical (or Required) Fields, see FIG. 1. If the fields are not specified, the following ones are used by default.

| Application | Document Category | Field1 | Field2 | Field3 | Field4 | Field 5 | Field 6 | Field 7 |
|---|---|---|---|---|---|---|---|---|
| Mobile Deposit | Checks | MICR | Legal Amount | Courtesy Amount | Endorsement | | | |
| Mobile Bill Pay | Remittance Coupons | Account Number | Payee.ZIP | Biller Name | | | | |

-continued

| Application | Document Category | Field1 | Field2 | Field3 | Field4 | Field 5 | Field 6 | Field 7 |
|---|---|---|---|---|---|---|---|---|
| Balance Transfer | Credit Card Bills | Account Number | Payee.ZIP | Biller Name | Balance Due | | | |
| Mobile Insurance | Driver License's | DL Number | Name | Address | DoB | Class | Sex | Expiration Date |

Computation of Usability Score

The usability computation involves data capture from the document image cropped out of the mobile image. Present MDIQU system uses a Mobile Preprocessing Engine and Dynamic Data Capture engine described in U.S. Pat. No. 8,379,914, which is incorporated herein by reference in its entirety.

The Document usability score is computed based on the set of captured critical fields or/and the confidence of each of such fields. As with the image quality test, the document usability tests results in a yes or no answer to the question of whether the document is usable, and will then further analyze the response to assign a grade value to the document based on how usable (or un-usable) it is.

Computer-Implemented Embodiment

Figure 7:
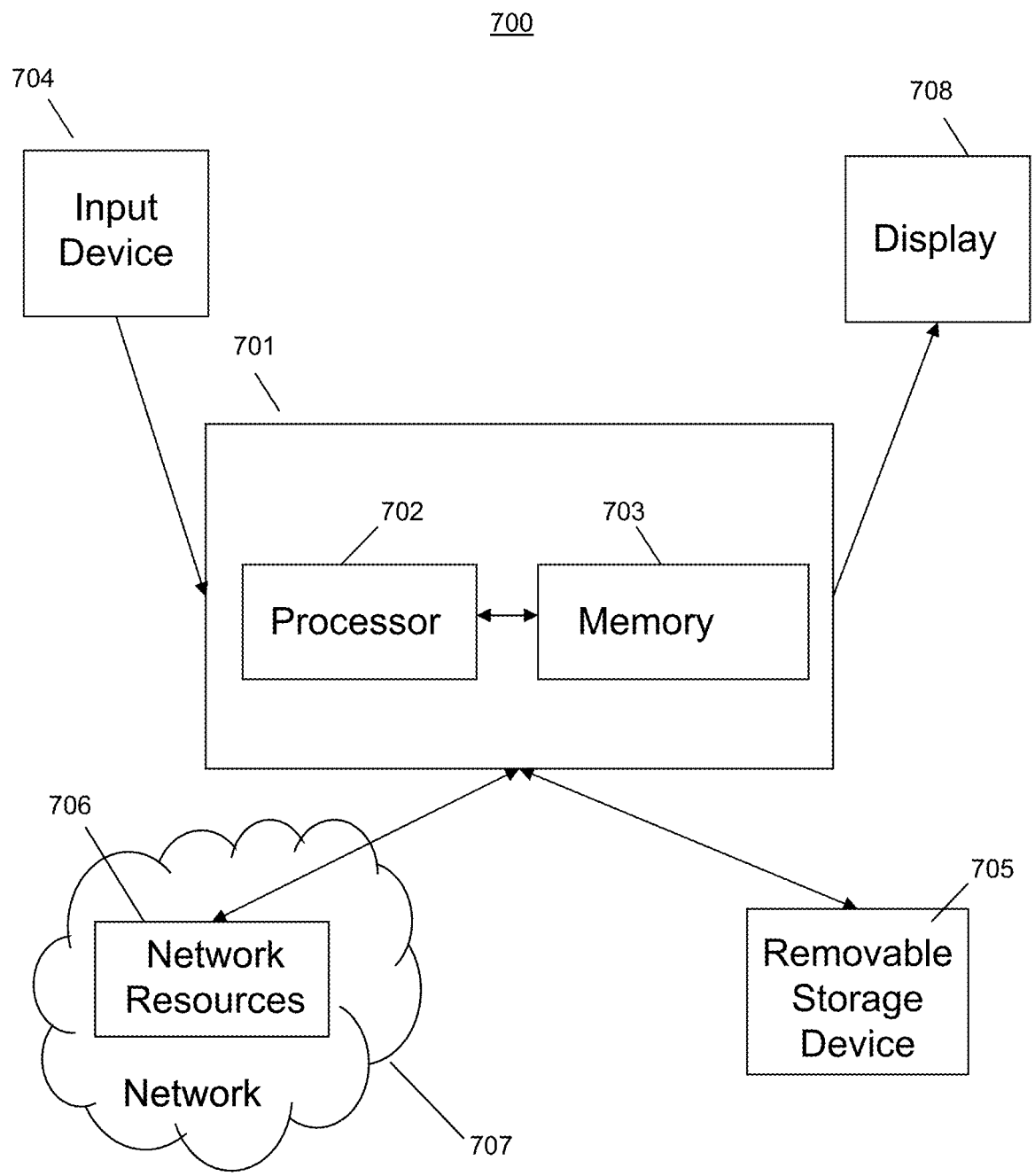
FIG. 7 is a block diagram that illustrates an embodiment of a computer/server system upon which an embodiment of the inventive methodology may be implemented The various embodiments mentioned above are described in further detail with reference to the aforementioned figured and the following detailed description of exemplary embodiments.

FIG. 7 is a block diagram that illustrates an embodiment of a computer/server system 700 upon which an embodiment of the inventive methodology may be implemented. The system 700 includes a computer/server platform 701 including a processor 702 and memory 703 which operate to execute instructions, as known to one of skill in the art. The term "computer-readable storage medium" as used herein refers to any tangible medium, such as a disk or semiconductor memory, that participates in providing instructions to processor 702 for execution. Additionally, the computer platform 701 receives input from a plurality of input devices 704, such as a keyboard, mouse, touch device or verbal command. The computer platform 701 may additionally be connected to a removable storage device 705, such as a portable hard drive, optical media (CD or DVD), disk media or any other tangible medium from which a computer can read executable code. The computer platform may further be connected to network resources 706 which connect to the Internet or other components of a local public or private network. The network resources 706 may provide instructions and data to the computer platform from a remote location on a network 707. The connections to the network resources 706 may be via wireless protocols, such as the 802.11 standards, Bluetooth® or cellular protocols, or via physical transmission media, such as cables or fiber optics. The network resources may include storage devices for storing data and executable instructions at a location separate from the computer platform 701. The computer interacts with a display 708 to output data and other information to a user, as well as to request additional instructions and input from the user. The display 708 may therefore further act as an input device 704 for interacting with a user.

While various embodiments have been described above, it should be understood that they have been presented by way of example only, and not of limitation. The breadth and scope should not be limited by any of the above-described exemplary embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer-readable medium comprising instructions which, when executed by a processor, cause the processor to:
    receive an image of a document within a particular one of a plurality of document categories, wherein the image has been captured by a mobile device;
    for each of a plurality of image quality assurance (IQA) tests, execute the IQA test on the image to produce an individual IQA score, wherein each of the plurality of IQA tests detects a different image deficiency and is associated with a weight for each of the plurality of document categories, wherein each weight for one of the plurality of document categories indicates a predetermined level of importance of the associated IQA test to that document category;
    compute a compound IQA score based on a combination of the individual IQA scores and the weights for the particular document category of the document in the image;
    when the compound IQA score does not satisfy a threshold indicating acceptable image quality, reject the image for further processing; and,
    when the compound IQA score satisfies the threshold,
        determine a usability score based on a set of data fields that are extracted from the image of the document, and
        accept or reject the image for further processing based on the usability score.

2. The non-transitory computer-readable medium of claim 1, wherein the image deficiencies detected by the plurality of IQA tests comprises one or more of: Out-of-focus (OOF), Shadow, Small size, View Skew (perspective distortion), Plain Skew, Warped, Low Internal Contrast, Reflection, Cut Corners, Cut Sides, Busy Background, or Low External Contrast.

3. The non-transitory computer readable medium of claim 2, wherein one of the plurality of IQA tests comprises generating a grey-scale snippet of the document, and using the grey-scale snippet to determine whether the grey-scale snippet is out of focus based on frequencies of high-contrast local areas.

4. The non-transitory computer readable medium of claim 2, wherein one of the plurality of IQA tests comprises generating a grey-scale snippet of the document, and using the grey-scale snippet to determine whether the grey-scale snippet includes a shadow by breaking the entire grey-scale snippet into two areas of different brightness, determining a delta in brightness, and a size of a darker of the two areas.

5. The non-transitory computer readable medium of claim 2, wherein one of the plurality of IQA tests comprises generating a grey-scale snippet of the document, and using the grey-scale snippet to determine whether the grey-scale snippet has low internal contrast by generating a histogram representative of brightness of pixels in the grey-scale snippet.

6. The non-transitory computer readable medium of claim 2, wherein one of the plurality of IQA tests comprises generating a grey-scale snippet of the document, and using the grey-scale snippet to determine a darkness of the grey-scale snippet by generating a histogram representative of a brightness of pixels in the grey-scale snippet and then generating a weighted average grey-scale value based on the histogram.

7. The non-transitory computer readable medium of claim 2, wherein one of the plurality of IQA tests determines whether a corner of the document is located outside of the image, and computing a penalty per corner when determining that one or more corners are outside of the image.

8. The non-transitory computer-readable medium of claim 1, wherein determining the usability score comprises computing the usability score based on confidence values for one or more data fields in the set of data fields that are predefined as critical.

9. The non-transitory computer-readable medium of claim 1, wherein the plurality of IQA tests comprises a shadowed test that indicates whether or not the image comprises a shadow, wherein the plurality of document categories comprises a mobile deposit, and wherein the shadowed test is associated with a higher weight for the mobile deposit than for one or more other ones of the plurality of document categories.

10. The non-transitory computer-readable medium of claim 1, wherein the plurality of IQA tests comprises a reflection test that indicates an amount of glare in the image, wherein the plurality of document categories comprises an insurance submission, and wherein the reflection test is associated with a higher weight for the insurance submission than for one or more other ones of the plurality of document categories.

11. The non-transitory computer-readable medium of claim 1, wherein the plurality of IQA tests comprises a warpage test that indicates a flatness of the document, wherein the plurality of document categories comprises a drivers license, and wherein the warpage test is associated with a lower weight for the drivers license than for one or more other ones of the plurality of document categories.

12. The non-transitory computer-readable medium of claim 1, wherein the plurality of IQA tests comprises a low external contrast test that indicates a measure of contrast between the document and a background, wherein the plurality of document categories comprises a drivers license, and wherein the low external contrast test is associated with a higher weight for the drivers license than for one or more other ones of the plurality of document categories.

13. The non-transitory computer-readable medium of claim 1, wherein the plurality of IQA tests comprises an out-of-focus test that indicates an amount of contrast in the image and one or more skew tests that each indicate a degree of skew of the document in the image, and wherein, for all of the plurality of document categories, the out-of-focus test is associated with a weight that is higher than the weight that is associated with each of the one or more skew tests.

14. A mobile device comprising an image capture device, memory configured to store instructions, and a processor configured to, when running the instructions:
receive an image of a document within a particular one of a plurality of document categories, wherein the image has been captured by the image capture device;
for each of a plurality of image quality assurance (IQA) tests, execute the IQA test on the image to produce an individual IQA score, wherein each of the plurality of IQA tests detects a different image deficiency and is associated with a weight for each of the plurality of document categories, wherein each weight for one of the plurality of document categories indicates a predetermined level of importance of the associated IQA test to that document category;
compute a compound IQA score based on a combination of the individual IQA scores and the weights for the particular document category of the document in the image;
when the compound IQA score does not satisfy a threshold indicating acceptable image quality, reject the image for further processing; and,
when the compound IQA score satisfies the threshold,
determine a usability score based on a set of data fields that are extracted from the image of the document, and
accept or reject the image for further processing based on the usability score.

15. The mobile device of claim 14, wherein the image deficiencies detected by the plurality of IQA tests comprises one or more of: Out-of-focus (OOF), Shadow, Small size, View Skew (perspective distortion), Plain Skew, Warped, Low Internal Contrast, Reflection, Cut Corners, Cut Sides, Busy Background, or Low External Contrast.

16. The mobile device of claim 15, wherein one of the plurality of IQA tests comprises generating a grey-scale snippet of the document, and using the grey-scale snippet to determine whether the grey-scale snippet is out of focus based on frequencies of high-contrast local areas.

17. The mobile device of claim 15, wherein one of the plurality of IQA tests comprises generating a grey-scale snippet of the document, and using the grey-scale snippet to determine whether the grey-scale snippet includes a shadow by breaking the entire grey-scale snippet into two areas of very different brightness, determining a delta in brightness, and a size of the darker of the two areas.

18. The mobile device of claim 15, wherein one of the plurality of IQA tests comprises generating a grey-scale snippet of the document, and using the grey-scale snippet to determine whether the grey-scale snippet has low internal contrast by generating a histogram representative of brightness of pixels in the grey-scale snippet.

19. The mobile device of claim 15, wherein one of the plurality of IQA tests comprises generating a grey-scale snippet of the document, and using the grey-scale snippet to determine a darkness of the grey-scale snippet by generating a histogram representative of a brightness of pixels in the grey-scale snippet and then generating a weighted average grey-scale value based on the histogram.

20. The mobile device of claim 15, wherein one of the plurality of IQA tests determines whether a corner of the document is located outside of the image, and computing a penalty per corner when determining that one or more corners are outside of the image.

\* \* \* \* \*